US011919549B1

(12) United States Patent
Bray et al.

(10) Patent No.: US 11,919,549 B1
(45) Date of Patent: Mar. 5, 2024

(54) FLEXIBLE RAIL SWITCHING COMPONENTS FOR CONTAINER SHUTTLES

(71) Applicant: Amazon Technologies, Inc., Seattle, WA (US)

(72) Inventors: Michael Alan Bray, Elkhorn, NE (US); Rajeev Dwivedi, Sammamish, WA (US)

(73) Assignee: Amazon Technologies, Inc., Seattle, WA (US)

(*) Notice: Subject to any disclaimer, the term of this patent is extended or adjusted under 35 U.S.C. 154(b) by 595 days.

(21) Appl. No.: 17/113,391

(22) Filed: Dec. 7, 2020

(51) Int. Cl.
*B61B 13/00* (2006.01)
*B65G 1/137* (2006.01)

(52) U.S. Cl.
CPC ............ *B61B 13/00* (2013.01); *B65G 1/1373* (2013.01)

(58) Field of Classification Search
CPC B61B 1/00; B61B 13/00; B61C 13/04; B61L 1/00; B61L 11/00; B61L 13/00; B65G 1/1373; E01B 7/00; E01B 7/06; E01B 7/18; E01B 7/20; E01B 25/00
See application file for complete search history.

(56) References Cited

FOREIGN PATENT DOCUMENTS

WO WO-0121895 A1 * 3/2001 ............. E01B 25/06

\* cited by examiner

*Primary Examiner* — Robert J McCarry, Jr.
(74) *Attorney, Agent, or Firm* — Eversheds Sutherland (US) LLP

(57) ABSTRACT

Systems, methods, and computer-readable media are disclosed for flexible rail switching components for container shuttles. In one embodiment, an example system for a shuttle may include an elongated spring steel plate, a first rail track component coupled to the elongated spring steel plate, a second rail track component coupled to the elongated spring steel plate and disposed adjacent to the first rail track component, and a third rail track component coupled to the elongated spring steel plate and disposed adjacent to the second rail track component. The elongated spring steel plate may be configured to be actuated from a first position to a second position. A distance between the first rail track component and the second rail track component when the elongated spring steel plate is in the second position may be less than when the elongated spring steel plate is in the first position.

18 Claims, 9 Drawing Sheets

FLEXIBLE RAIL SWITCHING COMPONENTS FOR CONTAINER SHUTTLES

BACKGROUND

As users increasingly make online purchases, fulfillment of such purchases and other orders may become increasingly complicated. For example, a fulfillment center may have output of upwards of one million packages per day. With such demands, efficiency of logistics related to processing orders and packages may be important. For example, use of equipment to move or otherwise handle objects may improve efficiency. However, such equipment may create chokepoints or cause bottlenecks in fulfillment center operations. Accordingly, improvements in various operations and components of order fulfillment, such as improvements to picking technology, sorting technology, transport technology, packing technology, and so forth may be desired, such that manual efforts can be redirected to different tasks.

Figure 1:
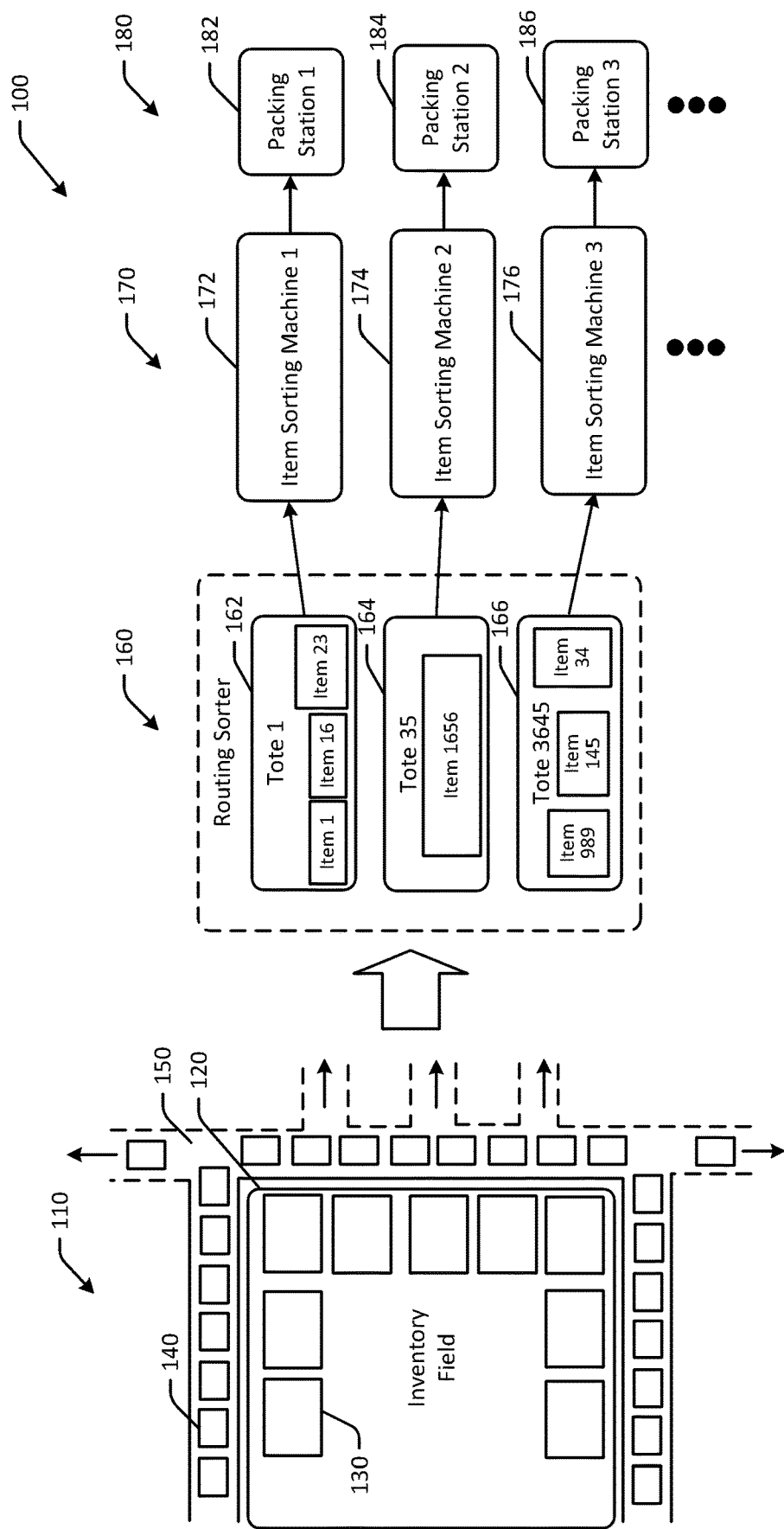
FIG. 1 is a hybrid schematic illustration of an example use case for flexible rail switching components for container shuttles in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. Humans may be able to manually handle individual items with ease. However, robotic handling of individual items may require various levels of dexterity. Moreover, fulfillment centers may include lengthy conveyors that may be used to transport objects, such as packages, products, items, or other objects, as well as containers that may be at least partially full of objects. Transport of containers or items (e.g., individual items or multiple items, etc.) may involve the use of container shuttles that move on one or more rails to transport a container from one location to another. For example, a container of items may be loaded onto a shuttle, and the shuttle may autonomously transport the container from an inventory field to a sortation system or other location. Movement of container shuttles along rails may be difficult in that the shuttle may have to execute a turn or may otherwise have to switch or shift from one set of rails to another. Switching between rails may be difficult due to high utilization of switching components, a frequency of switching operations to be performed by switching hardware, and low clearance space for magnet-driven shuttles.

To solve such issues, embodiments of the disclosure include flexible rail switching components for container shuttle systems that may be used to transport containers from one location or system of a fulfillment center to another. For example, embodiments of the disclosure may include one or more flexible rail switching components configured to facilitate transfer of a container shuttle from one set of rails to another. In some embodiments, the flexible switching components may allow for shuttles to make turns or to otherwise move from rails in one direction to rails in another direction, while maintaining the ability for the shuttle to be powered by electromagnets or other hardware. Some embodiments include flexible rail components that provide rapid switching performance, as well as durable and repeatable structure that allow for minimal maintenance under heavy use, such as one million switching operations over the course of a year. As a result of the durability and rapid switching provided by the flexible rail component design described herein, flexibility of the processing of items at the fulfillment center may be increased, such as by providing the ability to connect systems that may otherwise be disconnected. For example, an induction system may be coupled to a sortation system via the flexible rail components described herein. In addition, throughput of the fulfillment center may be increased and overall efficiency may be improved.

In a typical warehouse environment, such as that illustrated in FIG. 1, items may be transported through various means such as conveyors, belts, shuttles, etc. as they undergo different operations like picking, sorting, storing, shipping/dispatch, and so forth. In some of these cases, containers may be used to transport items, either individually or in groups, from one location to another. For instance, transporting items from a pick station to a sort station may involve the item(s) being picked into a container, such as a tote, which may then be transported via a shuttle.

Embodiments of the disclosure include methods and systems for flexible rail switching components for container shuttles that may improve processing and fulfillment of orders. Certain embodiments include rail switch mechanisms that are configured to redirect a shuttle from one path or set of rails to another. For shuttle rail arrangements that are limited by space, or instances where the conformity of rail bend is critical, individually actuating switch mechanisms may result in improved performance and/or less error. For curved segments, maintaining a curvilinear form using rail switch mechanisms may be important, so as to provide a smooth transition for a shuttle riding on the rails. Embodiments of the disclosure include flexible rail switching components that not only move from linear to curvilinear positions rapidly, but can also be individually actuated and provide highly repeatable performance, so as to provide a smooth path for a shuttle to move along. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Referring to FIG. 1, an example use case 100 for flexible rail switching components for container shuttles is depicted in accordance with one or more embodiments of the disclosure. Although discussed in the context of online orders, other embodiments may be directed to any suitable use case where containers are transported, such as instances where objects are picked from inventory, placed into containers, containers are transported, and so forth.

In FIG. 1, a fulfillment center may be a traditional fulfillment center and may include an inventory field 110, a routing sorter 160, one or more item sorting machines 170, and one or more packing stations 180. The inventory field 110 may include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include automated robotic arms, where the items are delivered to the picking stations 130 after being retrieved from the inventory field 110. Any number of picking stations 130 may be included, and the picking stations 130 may be located in a different position than that illustrated in FIG. 1.

In a traditional fulfillment center, such as that illustrated in FIG. 1, one or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more containers, such as totes 140. For example, as totes 140 move along the conveyors 150, items may be moved from the picking stations 130 into respective totes 140. The totes 140 may be associated with particular item sorting machines, and may be moved using the conveyors 150 to a routing sorter 160. In contrast, embodiments of the disclosure may not include some or all of the conveyors 150, and instead may include rails that may be used to guide shuttles from one location to another. The rails may have flexible rail switching components for container shuttles that allow for shuttles to move from a set of rails oriented in one direction to another set of rails.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may optionally guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of containers is used, flexible rail switching components for container shuttles systems and methods as described herein may be used. As a result, manual effort can be redirected to other tasks.

Embodiments of the disclosure include systems and methods for flexible rail switching components for container shuttles. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments And Use Cases

Figure 2:
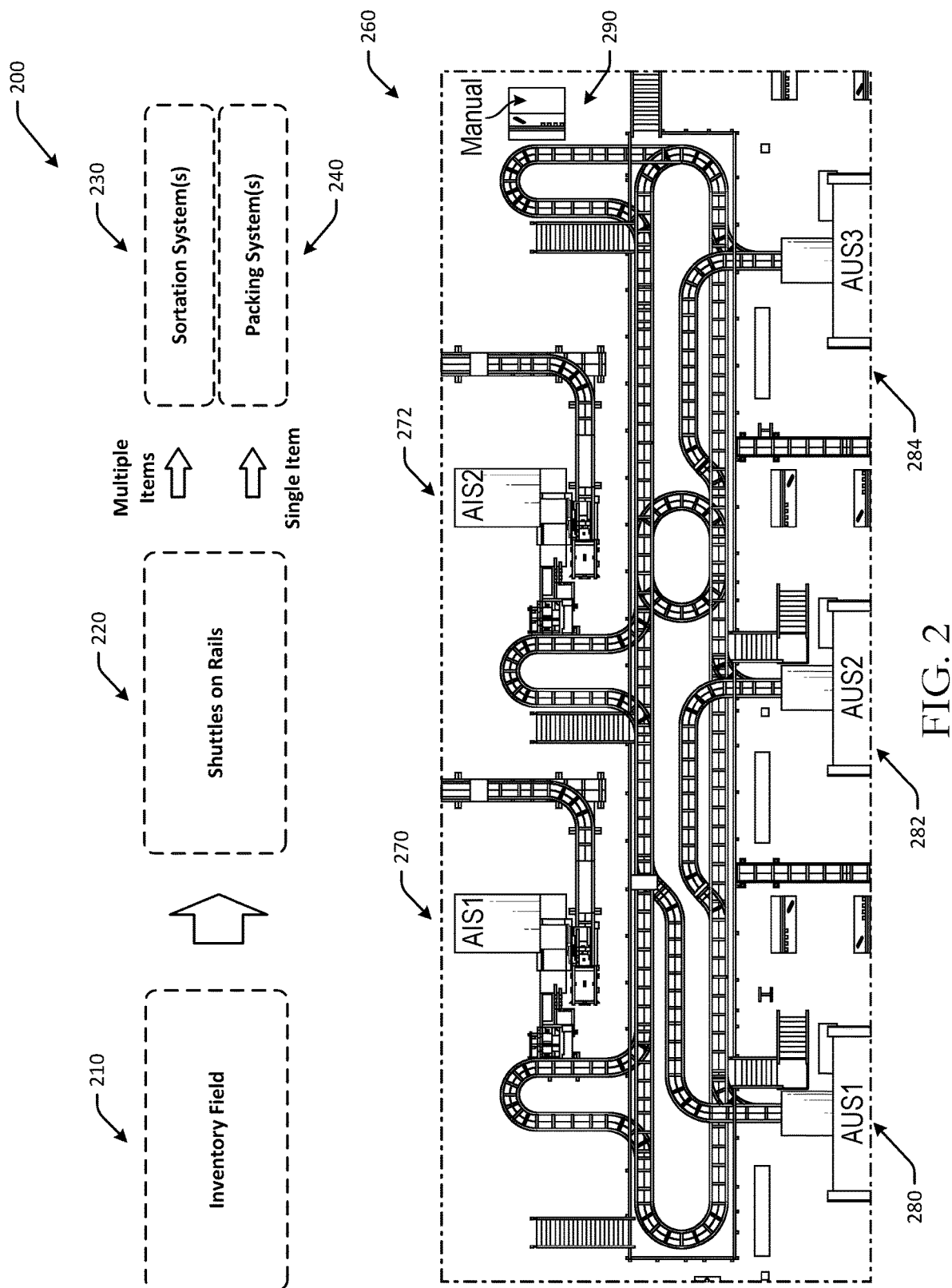
FIG. 2 is a schematic illustration of an example process flow and facility layout for flexible rail switching components for container shuttles in accordance with one or more embodiments of the disclosure.

FIG. 2 is a schematic illustration of an example process flow 200 and facility layout for flexible rail switching components for container shuttles in accordance with one or more embodiments of the disclosure. Other embodiments may include additional or fewer components. The illustration of FIG. 2 may not be to scale, and may not be illustrated to scale with respect to other figures.

In FIG. 2, a fulfillment center may include an inventory field 210, at which products or other items may be stored in inventory. As the items are ordered in online orders, the products may be picked from the inventory field 210 and routed for downstream processing in the fulfillment center. The items may be picked manually, using vehicles, or a combination thereof.

The picked products may be placed into one or more containers and the containers may be transported using one or more shuttles, such as one or more shuttles on rails 220.

The shuttles on rails 220 may include container shuttles that are configured to transport items and/or containers from one location to another via rails. The rails may include flexible switching components that allow for the shuttles to move from one set of rails to another. The shuttles on rails 220 may transport containers from the inventory field 210 to one or more downstream processes, such as a sortation system 230, or a packing system 240. For example, the sortation system 230 may be a system at which items picked from the inventory field 210 may be re-sorted into respective totes or other containers for particular orders. For example, items for different orders may be placed into containers that are transported by the shuttles on rails 220 from the inventory field 210. The containers may be sent to the sortation system 230 for sorting into particular orders. The packing system 240 may be a station at which one or more items associated with an order may be packed into a box or other container for shipment. A shipping label may be applied and the package may be dispatched to a loading dock or elsewhere for shipment. Other destinations or downstream processes in addition to, or instead of, the sortation systems and packing systems may be used.

A rail system 260 is depicted in schematic view in FIG. 2. The rail system 260 is an example of a network of rails that may be used by shuttles to transport containers from one location to another. The network of rails may include locations at which a shuttle can be directed to a straight path or to a loop, turn, oval, circle, and/or other geometries that involve a change in direction of a shuttle on the rails. Such changes in direction may be implemented using the flexible rail switching components described herein. The rail system 260 may include rails that link various systems, such as sortation systems, to each other and/or to other systems, such as container handling systems, manual induction systems 290, and so forth. For example, the rail system 290 may link a first sortation system 270 to a second sortation system 272, as well as to a first container handling system 280, a second container handling system 282, a third container handling system 284, and so forth. The rail system 260 may be used to connect any of the systems to each other and/or other systems.

Shuttles may move along the rails of the rail system 260. The shuttles may include linear drive motor or other drive components. Some drive components may provide a drive force via electromagnetism. As a result, one or more electromagnets may be disposed along the network of rails. Shuttles may optionally include a conveyor belt that may have a first set of one or more raised flaps and a second set of one or more raised flaps. The first set of raised flaps may form a first barrier along a first open-ended side of the shuttle, and the second set of raised flaps may form a second barrier along a second open-ended side of the shuttle to prevent items rolling off of the conveyor belt. The shuttles may include an on-board drive motor configured to move the conveyor belt in a forward direction and/or a reverse direction. The shuttles may include a magnet disposed on a lower surface of the shuttle. The magnet may be used to propel and/or secure the shuttle. For example, the magnet may prevent the shuttle from moving while the vehicle is in motion and the linear drive motor is engaged. To onboard or offload containers, the linear drive motor of the shuttle or other component may be used in conjunction with the magnet to impart motion.

Figure 3:
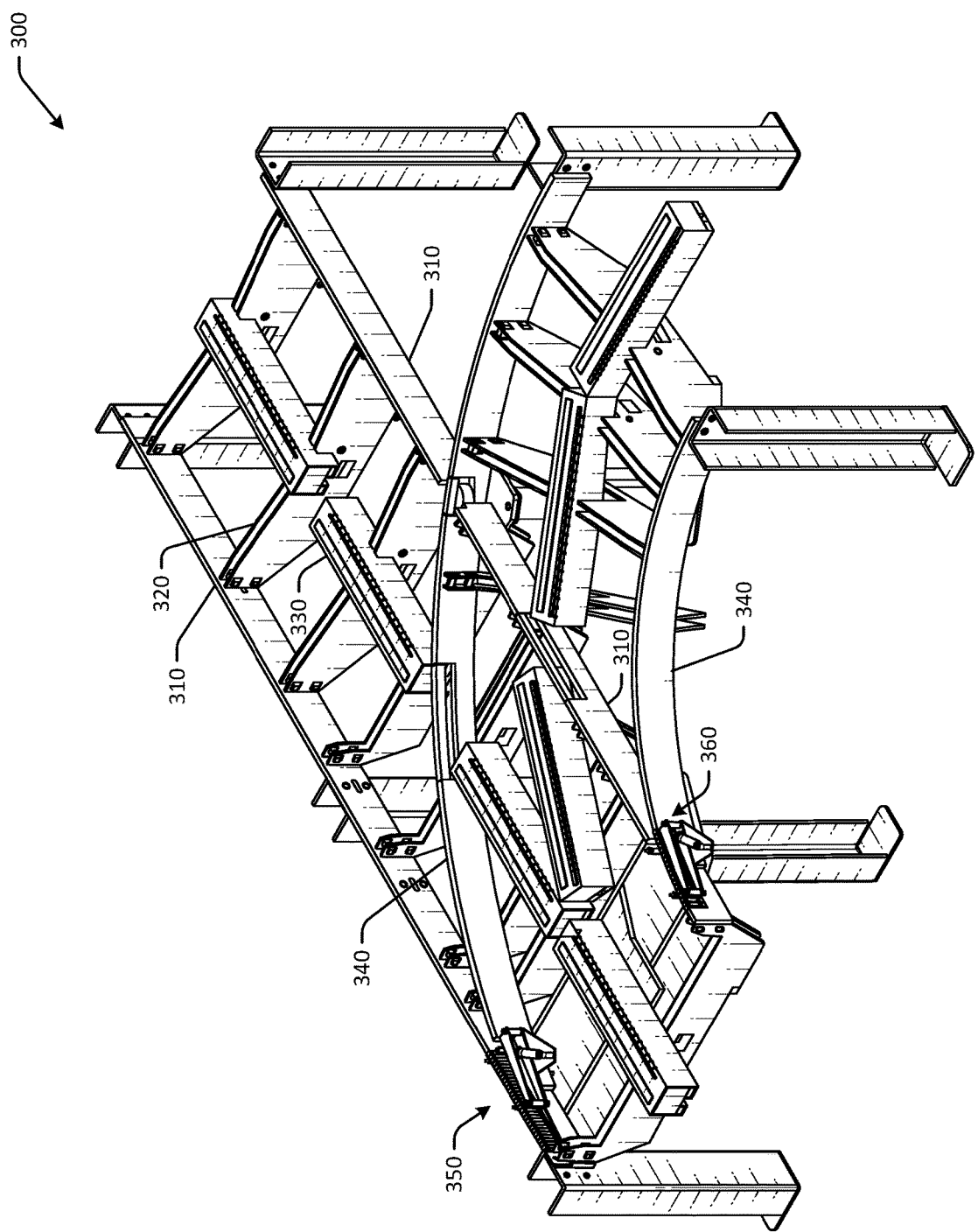
FIG. 3 is a schematic illustration of a perspective view of a flexible rail switching system in accordance with one or more embodiments of the disclosure.

FIG. 3 is a schematic illustration of a perspective view of a flexible rail switching system 300 in accordance with one or more embodiments of the disclosure. Other embodiments may include additional or fewer components. The illustration of FIG. 3 is not to scale, and may not be illustrated to scale with respect to other figures. The system illustrated in FIG. 3 may include the same flexible rail switching components for container shuttles discussed with respect to FIGS. 1-2, and/or may be used with any of the systems described herein.

The flexible rail switching system 300 may include one or more sets of rails on which shuttles may ride. The rails may guide shuttles to various locations. Each set of rails may include two rails, so as to support two sides of a shuttle on the rails. The flexible rail switching system 300 may include a number of supports 320 disposed between the two rails of a set of rails. A number of electromagnets 330 may optionally be disposed along the rails at various intervals.

The flexible rail switching system 300 may include one or more switch points, such as that illustrated in FIG. 3, where a shuttle may switch from a straight direction of travel to a curved direction of travel. For example, to travel in a straight direction, the shuttle may travel along a first set of rails 310, and to travel in a different direction (e.g., curve, turn, etc.), the shuttle may travel along a second set of rails 340.

To execute a switch between the first set of rails 310 and the second set of rails 340, the flexible rail switching system 300 may include a first flexible rail component 350 and a second flexible rail component 360. The first flexible rail component 350 and the second flexible rail component 360 may be used to guide a shuttle to either the first set of rails 310 or the second set of rails 340. The first flexible rail component 350 and the second flexible rail component 360 may be configured to switch from a linear orientation that leads to the first set of rails 310 to a curved orientation that leads to the second set of rails 340. The first flexible rail component 350 and the second flexible rail component 360 may be independently actuated. The first flexible rail component 350 may have a greater length than the second flexible rail component 360. In other embodiments, such as a left handed turn embodiment, the first flexible rail component 350 may have a shorter length than the second flexible rail component 360.

The first flexible rail component 350 and the second flexible rail component 360 may have a core of a spring steel plate. For example, the cores of the first flexible rail component 350 and the second flexible rail component 360 may be formed of an elongated spring steel member. The spring steel may be configured to flex from a linear orientation to a curvilinear orientation (e.g., to about 45 degrees, etc.) when actuated or otherwise under force. When released, the spring steel may return to a default linear orientation. The first flexible rail component 350 and the second flexible rail component 360 may each include one or more rail track components that are assembled around the core spring steel plate. Lightweight fasteners, such as lightweight rivets, screws, bolts, or other types of fasteners, such as adhesives, may be used to couple the rail track components to the spring steel plate. The rail track components may be assembled at regular intervals with spacing between consecutive rail track rail track components. As a result, the spacing between the rail track components when the first flexible rail component 350 and the second flexible rail component 360 are in a linear orientation may be greater than the spacing between the rail track components when the first flexible rail component 350 and the second flexible rail component 360 are in a curvilinear orientation. This may be because as the first flexible rail component 350 and the second flexible rail component 360 bend, the rail track components may get closer together. In the fully curved position, the rail track components may optionally be in contact with adjacent rail track components. The rail track components may have suitable interfaces to allow conformity when the first flexible rail component 350 and the second flexible rail component 360 switch from linear to curvilinear.

To actuate the first flexible rail component 350 and the second flexible rail component 360, a load offset with respect to the core structure may be applied. For example, a linear actuator such as pneumatic cylinder, solenoid, etc., may be used for actuation. The precise position of the first flexible rail component 350 and the second flexible rail component 360 may be controlled by placing mechanical constraints disposed adjacent to both the first flexible rail component 350 and the second flexible rail component 360. The spring steel of the first flexible rail component 350 and the second flexible rail component 360 may be a single piece or may be in a stacked configuration to control the extent of dampening so that the first flexible rail component 350 and the second flexible rail component 360 settle in place quickly, as discussed with respect to FIG. 7.

The flexible rail switching system 300 may therefore include a set of rails having a linear rail section, and a right-hand curved rail section. In some embodiments, there may be a junction that includes not only the linear rail section and the right-hand curved rail section, but a left-hand curved rail section as well. The flexible rail switching system 300 may include the first flexible rail component 350. The first flexible rail component 350 may include an elongated spring steel plate, a first rail track component coupled to the elongated spring steel plate, a second rail track component coupled to the elongated spring steel plate and disposed adjacent to the first rail track component, and a third rail track component coupled to the elongated spring steel plate and disposed adjacent to the second rail track component. The first flexible rail component 350 may be configured to be actuated from a first position aligned with the linear rail section, to a second position aligned with the right-hand curved rail section, and optionally to a third position aligned with the left-hand curved rail section (e.g., a curve in the opposite direction of that illustrated in FIGS. 3-4, etc.). A distance between the first rail track component and the second rail track component when the first flexible rail component 350 is in the second position or the optional third position is less than when the first flexible rail component 350 is in the first position or the straight position. The flexible rail switching system 300 may include the second flexible rail component 360 disposed adjacent to the first flexible rail component 350, where the second flexible rail component 350 has a shorter length than the first flexible rail component 350. A third flexible rail component may also be disposed adjacent to the first flexible rail component 350, and may have the same length as the second flexible rail component 350 for a three-way junction.

Figure 4:
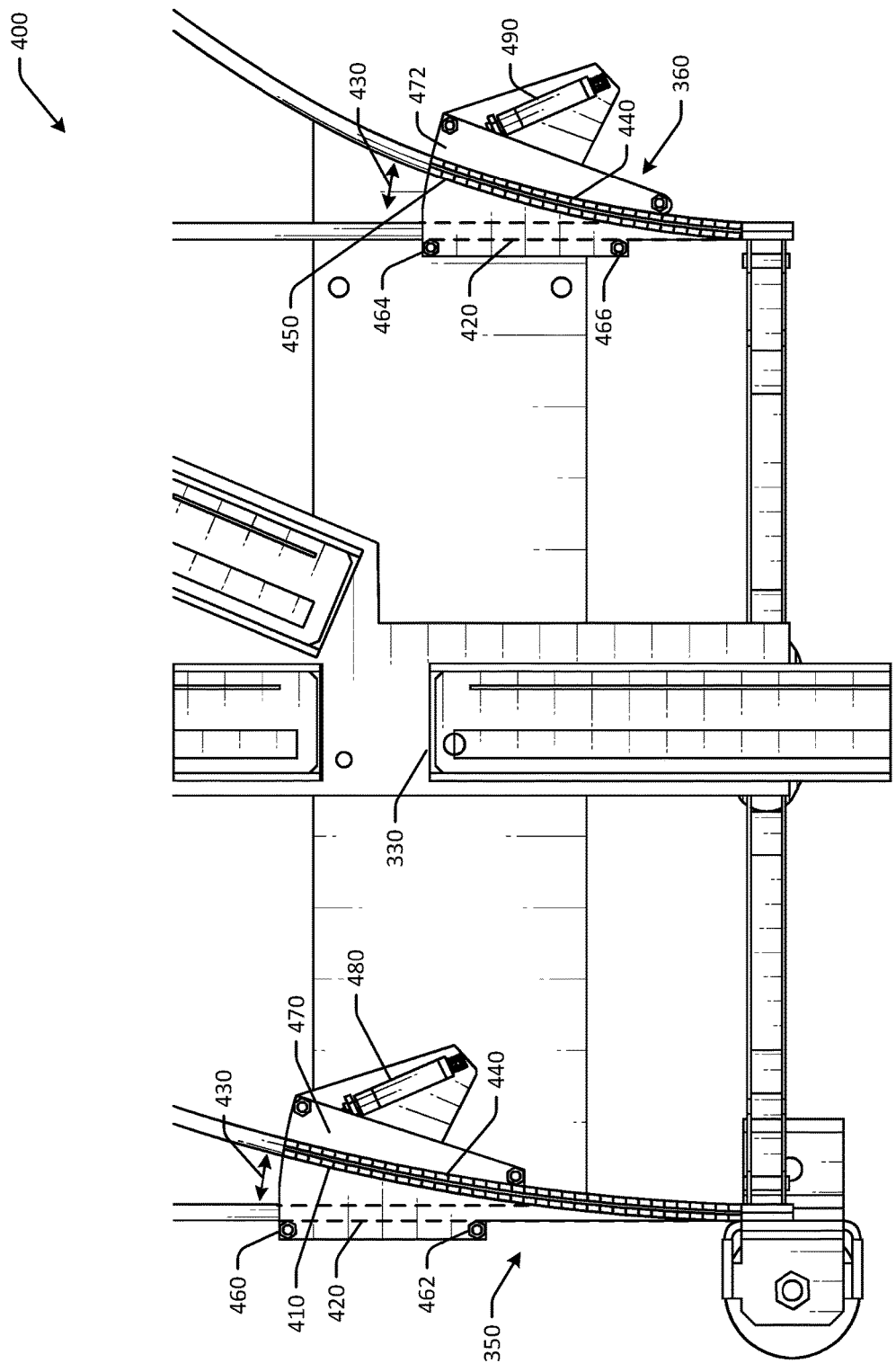
FIG. 4 is a schematic illustration of a top view of the flexible rail switching system of FIG. 3 in accordance with one or more example embodiments of the disclosure.

FIG. 4 depicts a schematic illustration 400 of a top view of the flexible rail switching system of FIG. 3 in accordance with one or more example embodiments of the disclosure. Other embodiments may include additional or fewer components. The illustration of FIG. 4 is not to scale, and may not be illustrated to scale with respect to other figures. The system illustrated in FIG. 4 may include the same flexible rail switching system discussed with respect to FIGS. 1-3.

In FIG. 4, the flexible rail switching system of FIG. 3 is depicted in top view. The flexible rail switching system may include a number of components disposed about the first flexible rail component 350 and the second flexible rail component 360. The first flexible rail component 350 may include a number of rail track components disposed about an elongated spring steel plate. For example, the first flexible rail component 350 may include a first rail track component coupled to the elongated spring steel plate, a second rail track component coupled to the elongated spring steel plate and disposed adjacent to the first rail track component, and a third rail track component coupled to the elongated spring steel plate and disposed adjacent to the second rail track component. The first rail track component, the second rail track component, and the third rail track component may have a width equal to the linear rail section and/or other adjacent static rail sections.

The elongated spring steel plate, or the first flexible rail component 350, may be configured to be actuated from a first position 420 to a second position 410. The first position 420 may be a straight or linear position, and the second position 410 may be a curved or bent position. The first flexible rail component 350 may therefore be configured to move back and forth from the respective positions in directions 430. The elongated spring steel plate and/or the first flexible rail component 350 may be adjacent to a linear rail section in the first position 420, and adjacent to a curved rail section in the second position 410. A distance between the first rail track component and the second rail track component when the elongated spring steel plate is in the second position 410 may be less than when the elongated spring steel plate is in the first position 420.

The flexible rail switching system may include an actuator 480 coupled to the elongated spring steel plate and/or the first flexible rail component 350. The actuator 480 may be configured to move the elongated spring steel plate and/or the first flexible rail component 350 from the first position 420 to the second position 410, and/or to move the elongated spring steel plate and/or the first flexible rail component 350 from the second position 410 to the first position 420.

The flexible rail switching system may include a number of supports to support the first flexible rail component 350 in the first position 420 and the second positon 410. For example, the flexible rail switching system may include a first support 460 and a second support 462 that support the first flexible rail component 350 in the first position 420. The first support 460 and the second support 462 may provide the ability to rapidly reposition the first flexible rail component 350 in the first position 420. The flexible rail switching system may include a curved support 470 that supports the first flexible rail component 350 in the second position 410. The curved support 470 may provide the ability to rapidly reposition the first flexible rail component 350 in the second position 410. The size of the curved support 470 may provide additional rigidity for the first flexible rail component 350, and prevent movement of the first flexible rail component 350 when a shuttle passes over the first flexible rail component 350. In other embodiments, different types of supports may be used to support the first flexible rail component 350 in the first position 420 and/or the second position 410. In some embodiments, the supports for the linear position may be smaller in size or number than the supports for the curved position. For example, the first support 460 and the second support 462 may be configured to contact a first number of rail track components, and the curved support 470 may be configured to contact a second number of rail track components, where the second number is greater than the first number.

Similarly, the second flexible rail component 360 may include a number of rail track components disposed about an elongated spring steel plate. The second flexible rail component 360 may include a first rail track component coupled to the elongated spring steel plate, a second rail track component coupled to the elongated spring steel plate and disposed adjacent to the first rail track component, and a third rail track component coupled to the elongated spring steel plate and disposed adjacent to the second rail track component. The first rail track component, the second rail track component, and the third rail track component may have a width equal to the linear rail section and/or other adjacent static rail sections.

The elongated spring steel plate, or the second flexible rail component 360, may be configured to be actuated from a first position 420 to a second position 450. The first position 420 may be a straight or linear position, and the second position 450 may be a curved or bent position. The second flexible rail component 360 may therefore be configured to move back and forth from the respective positions in directions 430. The elongated spring steel plate and/or the second flexible rail component 360 may be adjacent to a linear rail section in the first position 420, and adjacent to a curved rail section in the second position 450. A distance between the first rail track component and the second rail track component when the elongated spring steel plate is in the second position 450 may be less than when the elongated spring steel plate is in the first position 420.

The flexible rail switching system may include an actuator 490 coupled to the elongated spring steel plate and/or the second flexible rail component 360. The actuator 490 may be configured to move the elongated spring steel plate and/or the second flexible rail component 360 from the first position 420 to the second position 450, and/or to move the elongated spring steel plate and/or the second flexible rail component 360 from the second position 450 to the first position 420.

The flexible rail switching system may include a number of supports to support the second flexible rail component 360 in the first position 420 and the second positon 450. For example, the flexible rail switching system may include a first support 464 and a second support 466 that support the second flexible rail component 360 in the first position 420. The first support 464 and the second support 466 may provide the ability to rapidly reposition the second flexible rail component 360 in the first position 420. The flexible rail switching system may include a curved support 472 that supports the second flexible rail component 360 in the second position 450. The curved support 472 may provide the ability to rapidly reposition the second flexible rail component 360 in the second position 450. The size of the curved support 472 may provide additional rigidity for the second flexible rail component 360, and prevent movement of the second flexible rail component 360 when a shuttle passes over the second flexible rail component 360. In other embodiments, different types of supports may be used to support the second flexible rail component 360 in the first position 420 and/or the second position 450.

Figure 5A:
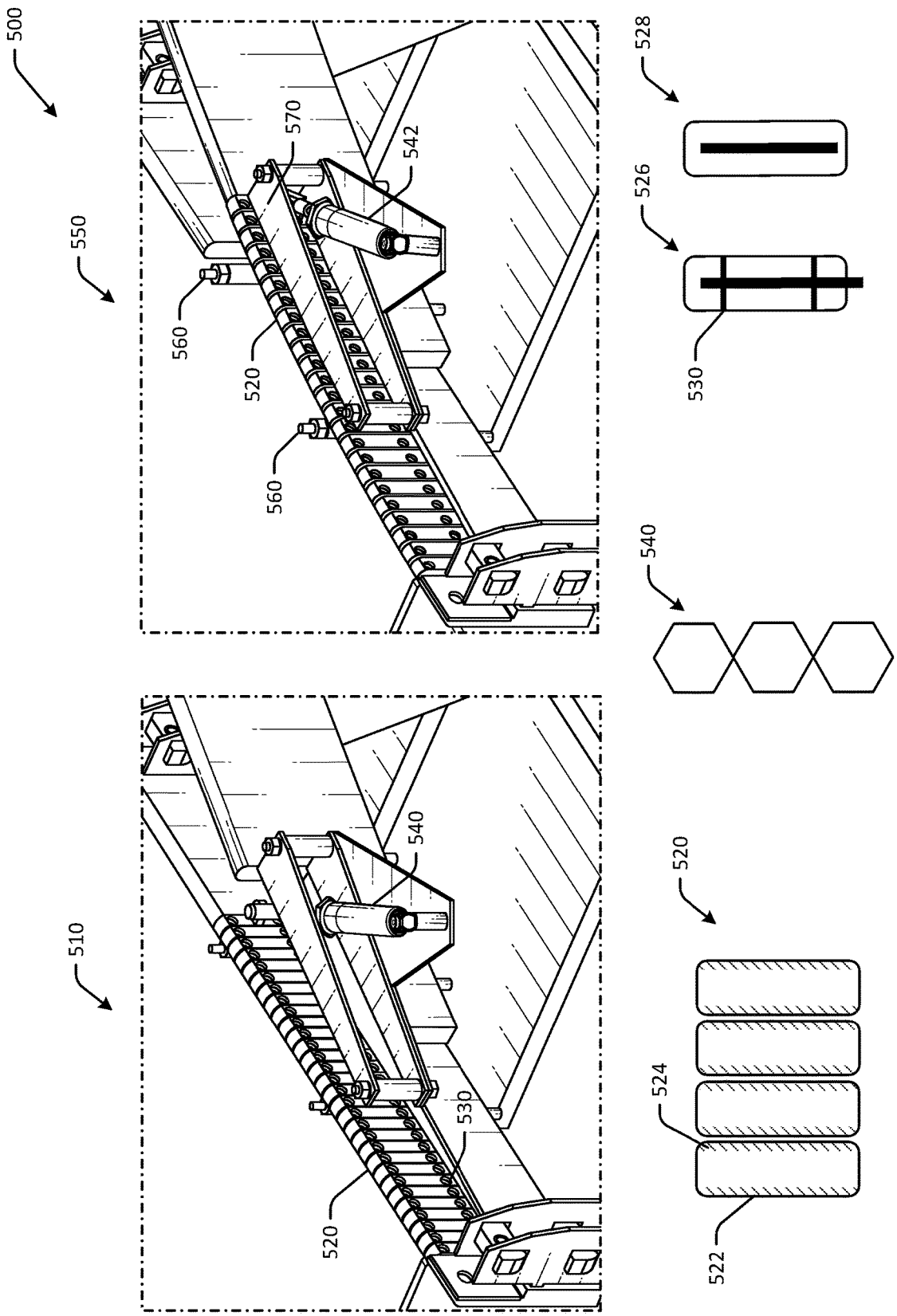
FIGS. 5A-5B are schematic illustrations of example flexible rail switching components in different positions in perspective and top views in accordance with one or more embodiments of the disclosure.
Figure 5B:
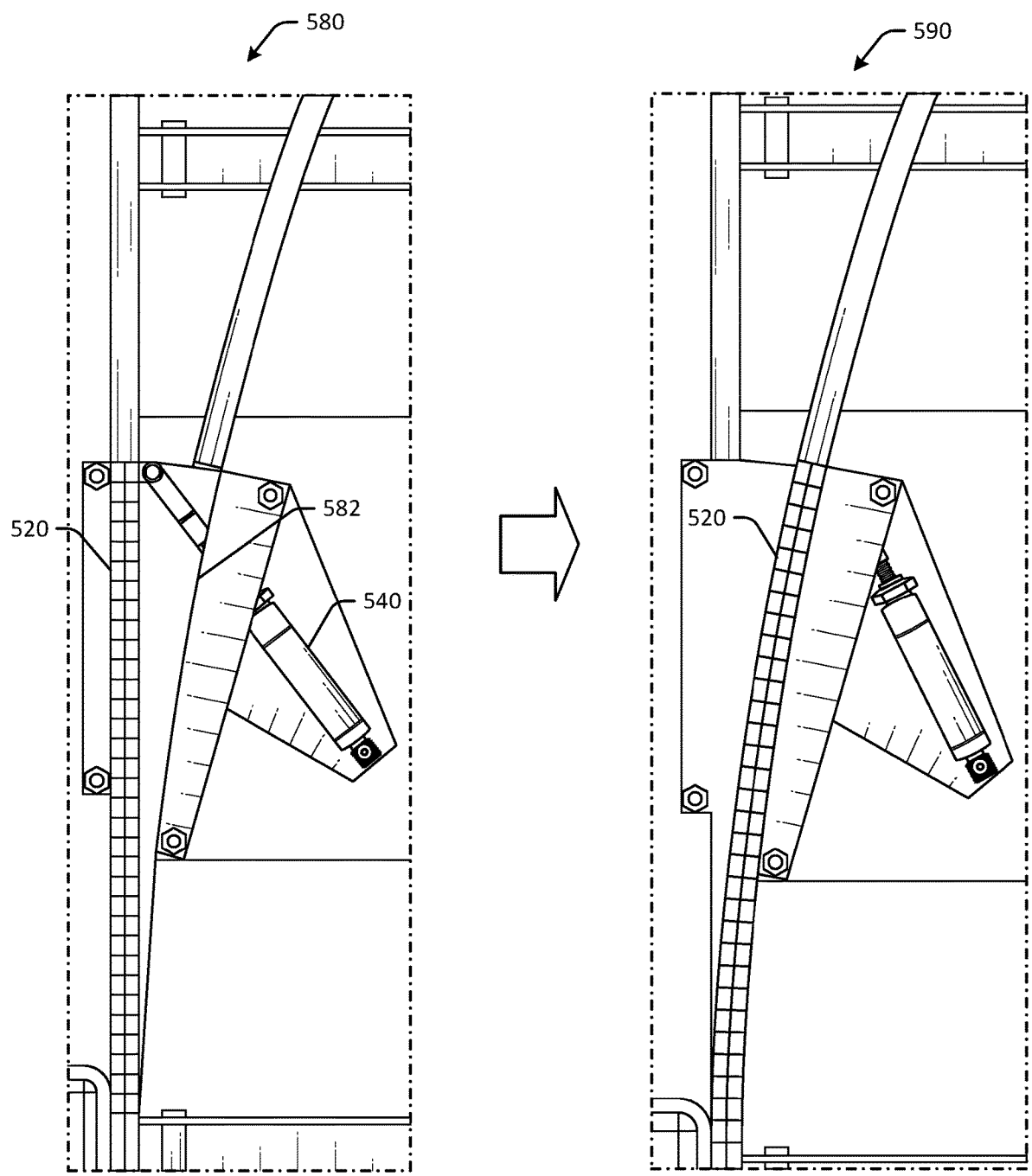

FIGS. 5A-5B are schematic illustrations of example flexible rail switching components in different positions in perspective and top views in accordance with one or more embodiments of the disclosure. Other embodiments may include additional or fewer components. The illustrations of FIGS. 5A-5B are not to scale, and may not be illustrated to scale with respect to other figures. The system illustrated in FIGS. 5A-5B may be the same flexible rail switching components for container shuttles discussed with respect to FIGS. 1-4.

In FIG. 5A, a schematic illustration 500 includes a flexible rail component 520 depicted in a linear position 510 and in a curved position 550. In FIG. 5B, the flexible rail component 520 is depicted in a top view 580 of the linear position, and a top view 590 of the curved position. As depicted in FIG. 5A, the flexible rail component 520 may include a number of rail track components coupled to an elongated steel plate. The rail track components may optionally be coupled to the elongated steel plate via one or more fasteners 530. An actuator 540 may be configured to actuate the flexible rail component 520 from the linear position 510 to the curved position 550. A support plate 570, which may have a curved surface 582, may support the flexible rail component 520 in the curved position 550. One or more cylindrical supports 560 may support the flexible rail component 520 in the linear position 510. The actuator 540 is depicted in a retracted position 542 when the flexible rail component 520 is in the curved position 550.

Individual rail track components are depicted in FIG. 5A. As illustrated, the rail track components may be spaced apart. When the flexible rail component 520 is in the linear position 510, the rail track components may be spaced at a maximum distance. Individual rail track components may include one or more chamfered surfaces, which may allow for a conformed or otherwise solid fit between adjacent rail track components when the flexible rail component 520 is in the curved position 550.

For example, a first rail track component may have a first chamfer 522 along a first edge and a second chamfer 524 along a second edge, the second rail track component may have a first chamfer along a first edge and a second chamfer along a second edge, the third rail track component may have a first chamfer along a first edge and a second chamfer along a second edge, and so forth. The chamfered surfaces may contact adjacent chamfered surfaces when the flexible rail component 520 is in the curved position 550.

In one embodiment 526, the flexible rail component 520 may include a number of rail C-shaped rail track components that are coupled to an elongated spring steel member (represented by the dark vertical rectangle in FIG. 5A). The rail track components may be coupled to the elongated spring steel member via one or more fasteners 530, such as screws, rivets, bolts, etc. Other embodiments may use adhesive instead of mechanical fasteners. In another embodiment 528, the rail track members may be injection molded, over-molded, or otherwise disposed about the elongated spring steel member, such that the elongated spring steel member is at least partially, or fully, surrounded by the rail track component. In such embodiments, locating features, such as blind holes and protrusions, or other features may be used to secure the outer layer to the elongated spring steel member and/or to prevent slippage or other movement between the rail track members and the elongated spring steel member.

As illustrated in top view 540, in other embodiments, the rail track components may have trapezoidal cross-sectional geometries (e.g., as viewed into the page, etc.), which may provide continuity or continuous contact between adjacent rail track components, as opposed to rectangular geometries which may result in gaps between adjacent rail track components. Such trapezoidal rail track components may result in improved shuttle ride quality due to reduced vibration and enhanced structural integrity.

Figure 6:
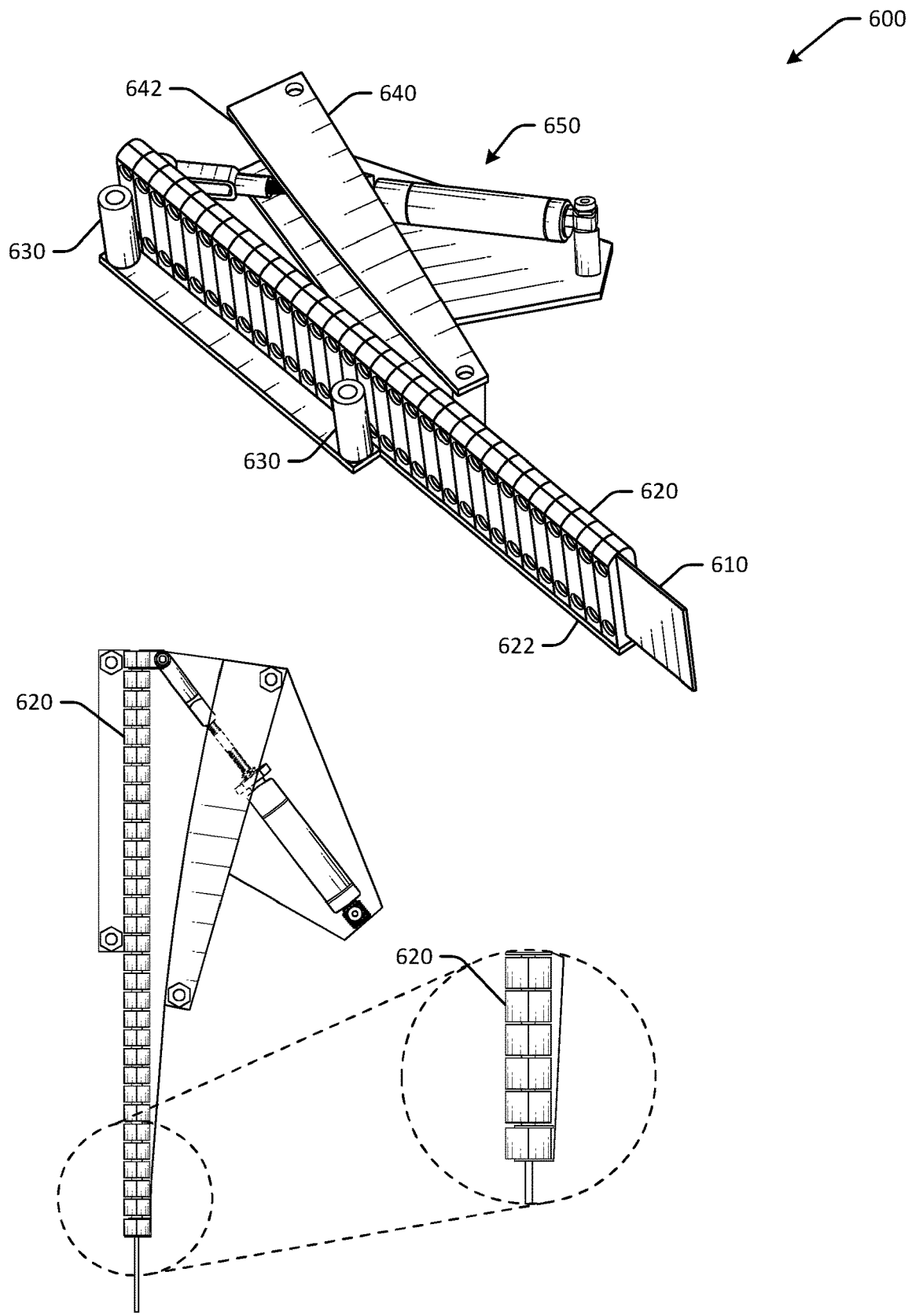
FIG. 6 is a schematic illustration of an example flexible rail switching component and actuator in accordance with one or more embodiments of the disclosure.

FIG. 6 is a schematic illustration of an example flexible rail switching component and actuator in accordance with one or more embodiments of the disclosure. Other embodiments may include additional or fewer components. The illustration of FIG. 6 is not to scale, and may not be illustrated to scale with respect to other figures. The system illustrated in FIG. 6 may be the same flexible rail switching components for container shuttles system discussed with respect to FIGS. 1-5B.

In FIG. 6, a flexible rail component 600 is depicted with a portion of an elongated spring steel member 610 exposed. The flexible rail component 600 may include one or more rail track components 620 coupled to the elongated spring steel member 610. The rail track components 620 may have a C-shape, and may optionally have flat bottom surfaces 622. As illustrated in the detail view of FIG. 6, the rail track components 620 may be spaced apart from each other when the flexible rail component 600 is in the linear orientation.

A number of supports 630 may support the flexible rail component 600 in the straight position, and a number of supports 640 may support the flexible rail component 600 in the curved position. The support 640 may include a curved surface 642. In some embodiments, an actuator 650 may be used to actuate the flexible rail component 600. In other embodiments, an electromagnetic system may be used to actuate the flexible rail component 600. For example, the rail track components may be electromagnetic rail track components, and the supports 630 and/or the supports 640 may be electromagnetic components. The supports or the rail track components may be energized or de-energized in sequence, so as to cause the flexible rail component 600 to conform to the curved position or the linear position. In some embodiments, where the curved support is an electromagnet, releasing the flexible rail component 600 may result in the flexible rail component 600 returning to its default linear position.

Figure 7:
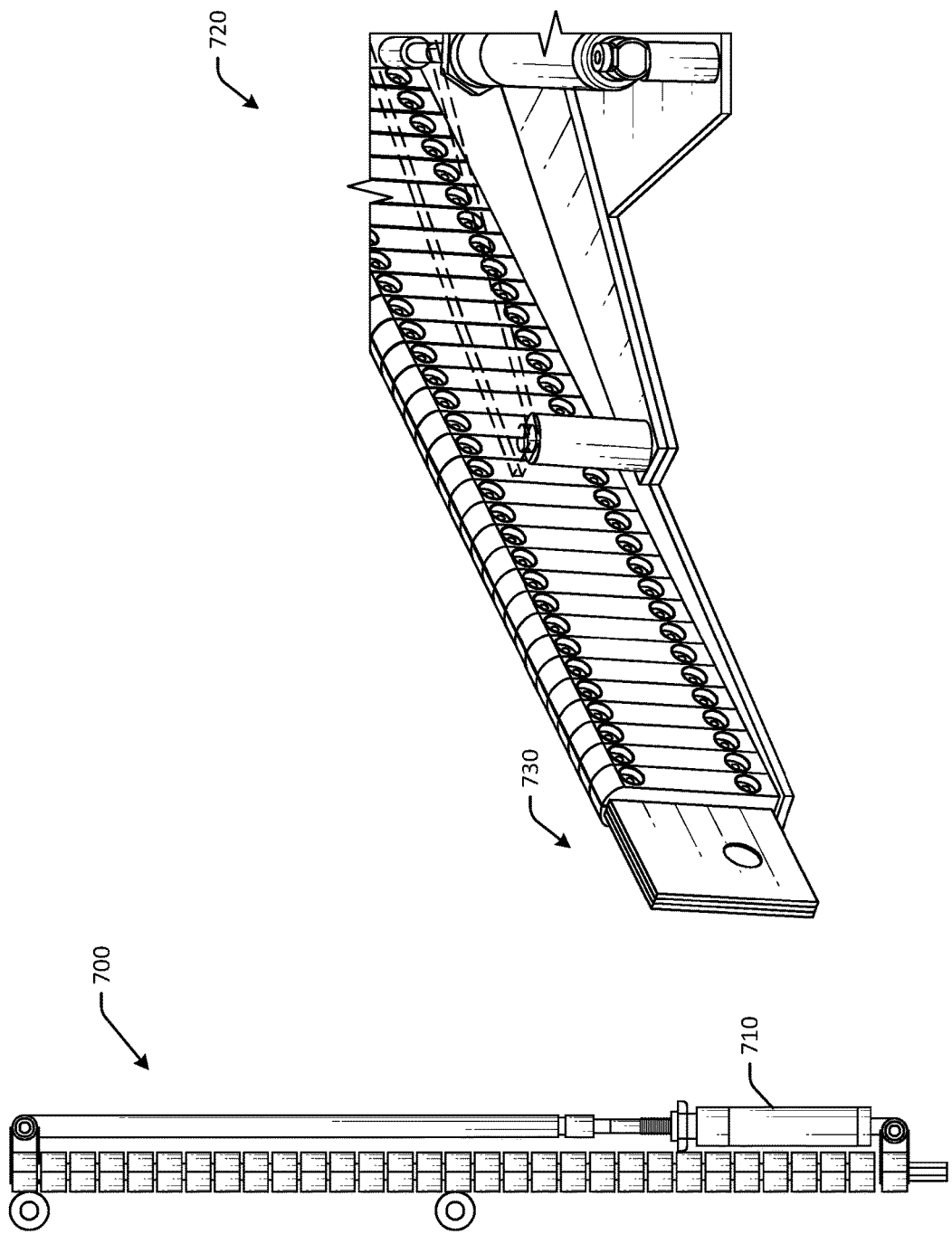
FIG. 7 is a schematic illustration of an offset actuator and a stacked spring steel plate in accordance with one or more embodiments of the disclosure.

FIG. 7 is a schematic illustration of an offset actuator and a stacked spring steel plate 720 in accordance with one or more embodiments of the disclosure. Other embodiments may include additional or fewer components. The illustration of FIG. 7 is not to scale, and may not be illustrated to scale with respect to other figures. The components illustrated in FIG. 7 may be used with the flexible rail switching systems discussed with respect to FIGS. 1-6.

In another embodiment of a flexible rail component 700, an actuator 710 may be positioned offset with respect to the flexible rail component 700. Unlike the embodiments illustrated in FIGS. 1-6, the actuator 710 may be aligned with the flexible rail component 700, instead of disposed at an angle as depicted in FIGS. 1-6. The actuator 710 may be a linear actuator. The arrangement depicted in FIG. 7 may result in a reduced footprint and increased ease of installation for the flexible rail component 700.

In another embodiment of a flexible rail component 720, the flexible rail component 720 may include a stacked spring steel core 730, instead of a single spring steel plate. For example, the flexible rail component 720 may include multiple elongated spring steel members arranged in a stacked configuration to control the extent of dampening so that the flexible rail component 720 settles in place quickly. In such embodiments, the flexible rail component 720 may include a first elongated spring steel plate, and a second elongated spring steel plate coupled to the first elongated spring steel plate. A number of rail track components may be coupled to both the first elongated spring steel plate and the second elongated spring steel plate in the stacked configuration 730.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
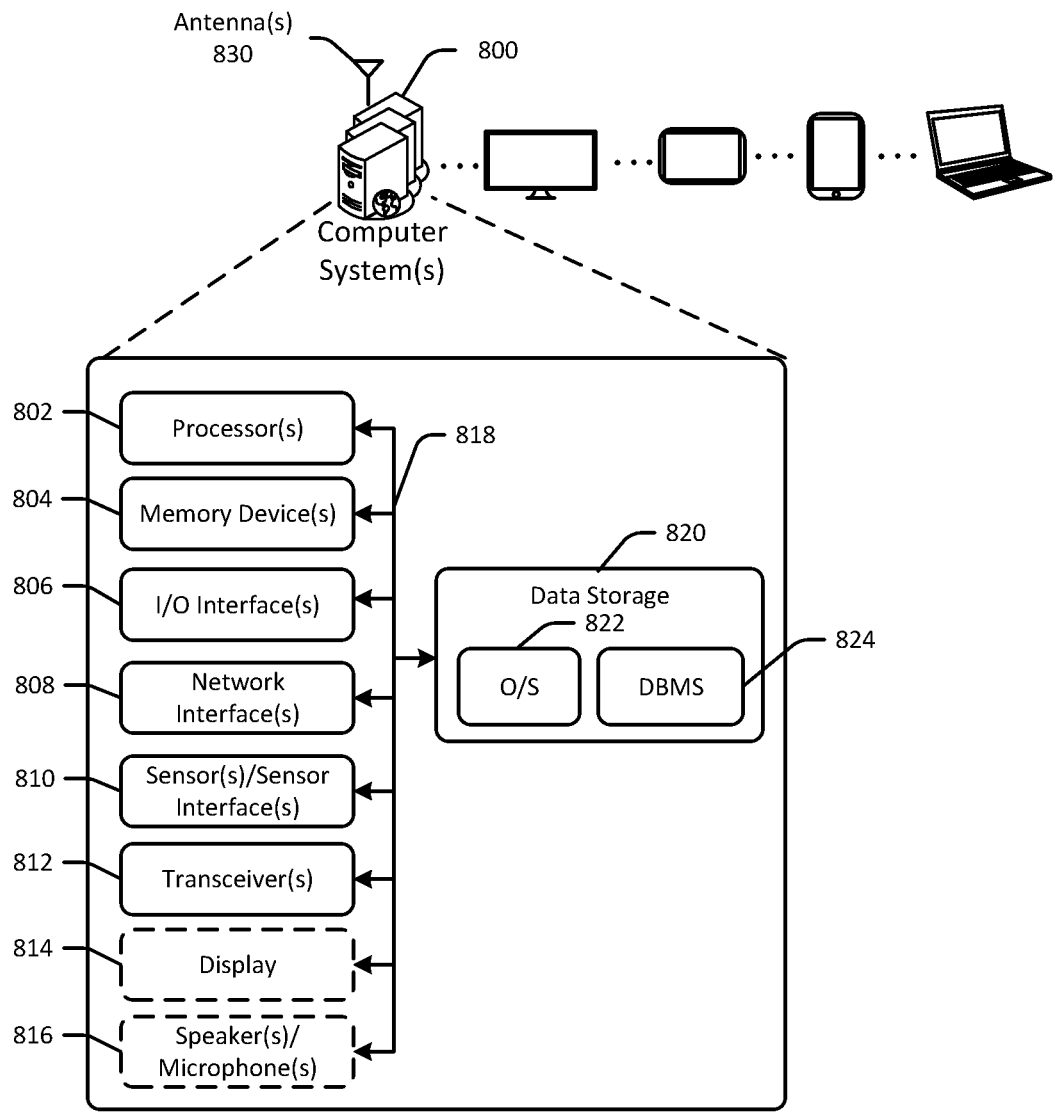
FIG. 8 schematically illustrates an example architecture of a computer system associated with a flexible rail switching system in accordance with one or more embodiments of the disclosure.

FIG. 8 is a schematic block diagram of one or more illustrative computer system(s) 800 associated with a flexible rail switching system in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the controller(s) of FIGS. 1-7. For example, the computer system(s) 800 may be a controller and may control one or more aspects of the flexible rail switching components for container shuttle systems described in FIGS. 1-7.

The computer system(s) 800 may be configured to communicate with one or more servers, user devices, or the like. The computer system(s) 800 may be configured to control rail switches, identify shuttles, direct shuttles, move shuttles, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system (s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna (s) 830. Non-limiting examples of suitable antenna(s) may include directional antenna(s), non-directional antenna(s), dipole antenna(s), folded dipole antenna(s), patch antenna (s), multiple-input multiple-output (MIMO) antenna(s), or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system (s) 800 to communicate with other devices. The transceiver (s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver (s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer- executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module (s) depicted in FIG. 8 may be implemented, at least partially, in hardware and/or firmware across any number of devices.

It should further be appreciated that the computer system (s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality Moreover, while certain module(s) may be depicted and described as sub-module(s) of another module, in certain embodiments, such module(s) may be provided as independent module(s) or as sub-module (s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD- ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
    a set of rails comprising a linear rail section, a right-hand curved rail section, and a left-hand curved rail section;
    a shuttle configured to transport individual items from a first location to a second location using the set of rails;
    a first flexible rail component comprising:
        an elongated spring steel plate;
        a first rail track component coupled to the elongated spring steel plate;
        a second rail track component coupled to the elongated spring steel plate and disposed adjacent to the first rail track component; and
        a third rail track component coupled to the elongated spring steel plate and disposed adjacent to the second rail track component, wherein the first rail track component, the second rail track component, and the third rail track component are electromagnetic rail track components;
    wherein the first flexible rail component is configured to be actuated from a first position aligned with the linear rail section, to a second position aligned with the right-hand curved rail section, and to a third position aligned with the left-hand curved rail section; and
    wherein a distance between the first rail track component and the second rail track component when the first flexible rail component is in the second position is less than when the first flexible rail component is in the first position; and
    a second flexible rail component disposed adjacent to the first flexible rail component,
    the second flexible rail component having a shorter length than the first flexible rail component.

2. The system of claim 1, wherein first rail track component comprises a first chamfer along a first edge and a second chamfer along a second edge, the second rail track component comprises a first chamfer along a first edge and a second chamfer along a second edge, and the third rail track component comprises a first chamfer along a first edge and a second chamfer along a second edge.

3. The system of claim 1, further comprising:
    a first support configured to contact the first flexible rail component in the first position; and
    a second support configured to contact the first flexible rail component in the second position;
    wherein the first support is configured to contact a first number of rail track components, and the second support is configured to contact a second number of rail track components, and wherein the second number is greater than the first number.

4. The system of claim 3, wherein the first support and the second support are electromagnetic components.

5. A system for a shuttle, the system comprising:
    an elongated spring steel plate;
    a first rail track component coupled to the elongated spring steel plate;
    a second rail track component coupled to the elongated spring steel plate and disposed adjacent to the first rail track component; and
    a third rail track component coupled to the elongated spring steel plate and disposed adjacent to the second rail track component;
    wherein the elongated spring steel plate is configured to be actuated from a first position to a second position, and wherein a distance between the first rail track component and the second rail track component when the elongated spring steel plate is in the second position is less than when the elongated spring steel plate is in the first position; and
    wherein the first rail track component, the second rail track component, and the third rail track component are electromagnetic rail track components.

6. The system of claim 5, wherein first rail track component comprises a first chamfer along a first edge and a second chamfer along a second edge, the second rail track component comprises a first chamfer along a first edge and a second chamfer along a second edge, and the third rail track component comprises a first chamfer along a first edge and a second chamfer along a second edge.

7. The system of claim 5, wherein the first rail track component is in contact with the second rail track component when the elongated spring steel plate is in the second position, and the third rail track component is in contact with the second rail track component when the elongated spring steel plate is in the second position, and wherein the distance is a distance measured between outer lateral surfaces.

8. The system of claim 5, wherein the elongated spring steel plate is adjacent to a linear rail section in the first position, and wherein the elongated spring steel plate is adjacent to a curved rail section in the second position.

9. The system of claim 8, wherein the first rail track component, the second rail track component, and the third rail track component have a width equal to the linear rail section.

10. The system of claim 5, further comprising:
    a first support configured to support the elongated spring steel plate in the first position; and
    a second support configured to support the elongated spring steel plate in the second position.

11. The system of claim 10, wherein the first support is configured to contact a first number of rail track components, and the second support is configured to contact a second number of rail track components, and wherein the second number is greater than the first number.

12. The system of claim 5, further comprising:
an actuator coupled to the elongated spring steel plate, the actuator configured to move the elongated spring steel plate from the first position to the second position.

13. The system of claim 5, wherein the elongated spring steel plate is a first elongated spring steel plate, the system further comprising:
a second elongated spring steel plate coupled to the first elongated spring steel plate;
wherein the first rail track component, the second rail track component, and the third rail track component are coupled to both the first elongated spring steel plate and the second elongated spring steel plate.

14. The system of claim 5, wherein the first rail track component, the second rail track component, and the third rail track component are C-shaped rail track components.

15. A system comprising:
a first elongated spring steel plate;
a second elongated spring steel plate coupled to the first elongated spring steel plate;
a first chamfered rail track component coupled to the first elongated spring steel plate and the second elongated spring steel plate;
a second chamfered rail track component coupled to the first elongated spring steel plate and the second elongated spring steel plate; and
a third chamfered rail track component coupled to the first elongated spring steel plate and the second elongated spring steel plate;
wherein the first elongated spring steel plate and the second elongated spring steel plate are configured to be actuated from a first position to a second position; and
wherein the first chamfered rail track component, the second chamfered rail track component, and the third chamfered rail track component are electromagnetic rail track components.

16. The system of claim 15, wherein a distance between the first chamfered rail track component and the second chamfered rail track component when the first elongated spring steel plate and the second elongated spring steel plate are in the second position is less than when the first elongated spring steel plate and the second elongated spring steel plate are in the first position.

17. The system of claim 15, wherein the first chamfered rail track component, the second chamfered rail track component, and the third chamfered rail track component are C-shaped rail track components.

18. The system of claim 15, further comprising:
an actuator coupled to the first elongated spring steel plate and the second elongated spring steel plate, the actuator configured to move the first elongated spring steel plate and the second elongated spring steel plate from the first position to the second position.

* * * * *